US012613325B2

(12) United States Patent
Majaniemi

(10) Patent No.: US 12,613,325 B2
(45) Date of Patent: Apr. 28, 2026

(54) CHANNEL RECOVERY USING GROUP DELAY INFORMATION

(71) Applicant: Silicon Laboratories Inc., Austin, TX (US)

(72) Inventor: Markku Majaniemi, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 214 days.

(21) Appl. No.: 18/659,261

(22) Filed: May 9, 2024

(65) Prior Publication Data

US 2025/0347797 A1 Nov. 13, 2025

(51) Int. Cl.
*G01S 13/08* (2006.01)
*B60R 25/24* (2013.01)

(52) U.S. Cl.
CPC ............ *G01S 13/08* (2013.01); *B60R 25/245* (2013.01); *B60R 2325/105* (2013.01)

(58) Field of Classification Search
CPC ..... G01S 13/08; G01S 13/765; B60R 25/245; B60R 2325/105
USPC ........................................ 342/118
See application file for complete search history.

(56) References Cited

U.S. PATENT DOCUMENTS

| | | | | |
|---|---|---|---|---|
| 5,869,908 A * | 2/1999 | Moczygemba | .... | G07C 9/00182 |
| | | | | 180/287 |
| 9,155,063 B2 * | 10/2015 | Woo | ..................... | H04W 64/006 |
| 9,338,606 B2 * | 5/2016 | Moshfeghi | .............. | H04W 4/02 |
| 9,660,743 B1 * | 5/2017 | Ashkenazi | ........... | H04B 17/364 |
| 10,055,567 B2 * | 8/2018 | Ulrich | ..................... | G06F 21/35 |
| 10,192,416 B2 * | 1/2019 | Emmanuel | ......... | G08B 13/2494 |
| 10,916,079 B2 * | 2/2021 | O'Toole | ................ | H04W 12/64 |
| 11,518,343 B2 * | 12/2022 | Schat | ..................... | H04W 4/40 |

(Continued)

FOREIGN PATENT DOCUMENTS

| | | | | | |
|---|---|---|---|---|---|
| CN | 106664265 B | * | 5/2020 | ........... | G01S 5/0054 |
| CN | 112166632 B | * | 11/2022 | ............ | H04W 24/10 |

(Continued)

OTHER PUBLICATIONS

Bluetooth Sig Proprietary; "Channel Sounding," Core Specification Working Group, Jun. 22, 2023, pp. 1-284.

(Continued)

*Primary Examiner* — Nuzhat Pervin
(74) *Attorney, Agent, or Firm* — Trop, Pruner & Hu, P.C.

(57) ABSTRACT

In one embodiment, a method includes: determining, for each of a plurality of first channels of a wireless link between an initiator device and a reflector device, a channel response metric; providing, for each of a plurality of second channels comprising advertisement channels, a predetermined value for a channel response metric; calculating a group delay for each of the plurality of first channels and each of the plurality of second channels based on the channel response metric for the corresponding channel and the channel response metric for a neighboring channel; determining a group delay metric based on the group delay for the plurality of first channels and the plurality of second channels; and calculating, for each of the plurality of second channels, a channel response metric based on the channel response metric for the neighboring channel and the group delay metric.

19 Claims, 5 Drawing Sheets

(56) References Cited

U.S. PATENT DOCUMENTS

| | | | | |
|---|---|---|---|---|
| 11,754,669 | B2 * | 9/2023 | Gulati | G01S 13/325 |
| | | | | 342/201 |
| 12,302,158 | B2 * | 5/2025 | Jiang | H04W 24/10 |
| 2007/0024416 | A1 * | 2/2007 | Tang | B60R 25/245 |
| | | | | 340/5.72 |
| 2008/0174446 | A1 * | 7/2008 | Ghabra | G07C 9/00309 |
| | | | | 340/13.2 |
| 2009/0103640 | A1 * | 4/2009 | Chen | H04L 25/0212 |
| | | | | 375/260 |
| 2013/0090057 | A1 * | 4/2013 | Green | H04W 12/08 |
| | | | | 455/26.1 |
| 2016/0018509 | A1 * | 1/2016 | Mccorkle | G01S 5/12 |
| | | | | 342/386 |
| 2017/0061110 | A1 * | 3/2017 | Wright | G06F 21/32 |
| 2017/0212210 | A1 * | 7/2017 | Chen | G01S 5/06 |
| 2017/0346934 | A1 * | 11/2017 | Dentamaro | H04M 1/72412 |
| 2019/0372688 | A1 * | 12/2019 | Sadiq | H04W 64/00 |
| 2019/0373595 | A1 * | 12/2019 | Sadiq | H04W 64/006 |
| 2020/0119462 | A1 * | 4/2020 | Guthrie | G07C 9/00309 |
| 2020/0119463 | A1 * | 4/2020 | Stitt | G07C 9/00309 |
| 2021/0099970 | A1 * | 4/2021 | Omer | G01S 13/52 |
| 2021/0105155 | A1 * | 4/2021 | Kons | H04L 25/0248 |
| 2021/0159992 | A1 * | 5/2021 | Sadiq | H04W 64/00 |
| 2021/0160001 | A1 * | 5/2021 | Hiscock | H04L 1/0015 |
| 2021/0204136 | A1 * | 7/2021 | Lummer | H04B 17/27 |
| 2023/0322186 | A1 * | 10/2023 | Lerch | G07C 9/00309 |
| | | | | 340/5.61 |
| 2024/0045017 | A1 * | 2/2024 | Hammerschmidt | H04W 72/0446 |
| 2024/0080692 | A1 * | 3/2024 | Jiang | H04B 7/0417 |
| 2024/0380640 | A1 * | 11/2024 | Silverman | H04L 25/0204 |
| 2024/0397399 | A1 * | 11/2024 | Gupta | H04W 36/322 |
| 2025/0106587 | A1 * | 3/2025 | Ledvina | G07C 9/29 |
| 2025/0273028 | A1 * | 8/2025 | Alvarez-Castrillon | B60R 25/245 |

FOREIGN PATENT DOCUMENTS

| | | | | | |
|---|---|---|---|---|---|
| EP | | 3089894 | B1 * | 12/2018 | B60R 25/2081 |
| WO | WO-2006096277 | A1 * | | 9/2006 | G07C 9/00309 |

OTHER PUBLICATIONS

Hillyard et al; Bluetooth Blog, Bluetooth Channel Sounding—A Step Towards 10-cm Ranging Accuracy for Secure Access, Digital Key, and Proximity Services, Nov. 30, 2023, pp. 1-8.

Silicon Labs; "Channel Sounding", Wireless //Bluetooth //Channel Sounding, 2024, pp. 1-7.

The Mathworks, Inc., "Unwrap—Shift phase angles", downloaded from https://www.mathworks.com/help/matlab/ref/unwrap.html#f98-998446_vh, published at least as early as Jan. 1, 2024, pp. 1-8.

* cited by examiner

200

Start

210  Initiate channel sounding process with reflector

220  Transmit and receive channel sounding messages on non-advertisement channels 230  Store received channel sounding messages in storage 240  Notify processor regarding channel sounding process completion

300

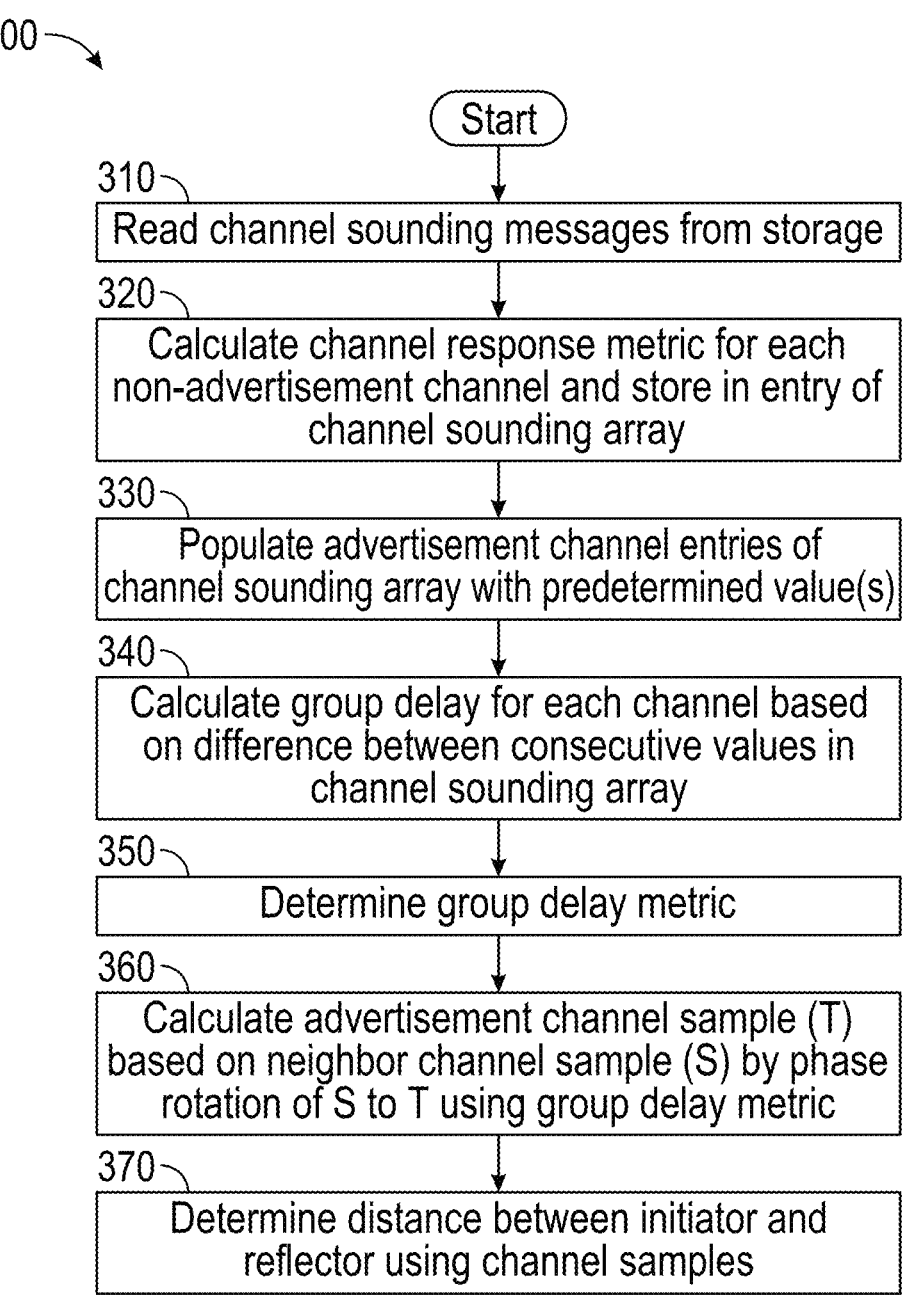

Start

310
Read channel sounding messages from storage

320
Calculate channel response metric for each non-advertisement channel and store in entry of channel sounding array 330
Populate advertisement channel entries of channel sounding array with predetermined value(s)

340
Calculate group delay for each channel based on difference between consecutive values in channel sounding array 350
Determine group delay metric 360
Calculate advertisement channel sample (T) based on neighbor channel sample (S) by phase rotation of S to T using group delay metric 370
Determine distance between initiator and reflector using channel samples

FIG. 3

CHANNEL RECOVERY USING GROUP DELAY INFORMATION

BACKGROUND

Wireless devices are ubiquitous, and are used in a wide variety of situations. Some use cases involve two devices in close proximity to each other, where it is desired to accurately determine a distance between the devices. One solution for distance estimation in Bluetooth implementations is a High Accuracy Distance Measurement (HADM) that leverages a channel sounding process. In this process, a channel response between initiator and reflector is sampled at different channel frequencies. Distance estimation is then based on these samples. However, the sampling performed during the channel sounding process is missing in frequencies dedicated to advertisement channels, and thus the obtained samples are non-uniform in frequency. Many distance estimation techniques require uniform sampling. Current techniques such as using a neural network to recover missing information in advertisement channels can consume significant processing resources, and further can suffer from limitations on data dependency on training data used for training the neural network.

SUMMARY OF THE INVENTION

In one aspect, a method includes: determining, for each of a plurality of first channels of a wireless link between an initiator device and a reflector device, a channel response metric; providing, for each of a plurality of second channels comprising advertisement channels, a predetermined value for a channel response metric; calculating a group delay for each of the plurality of first channels and each of the plurality of second channels based on the channel response metric for the corresponding channel and the channel response metric for a neighboring channel; determining a group delay metric based on the group delay for the plurality of first channels and the plurality of second channels; and calculating, for each of the plurality of second channels, a channel response metric based on the channel response metric for the neighboring channel and the group delay metric.

In one implementation, the method further comprises determining a distance between the initiator device and the reflector device based at least in part on the channel response metric for each of the plurality of first channels and the calculated channel response metric for each of the plurality of second channels. The method may also include: identifying, based at least in part on the distance, that the reflector device is within a threshold distance of the initiator device; and enabling access to a protected location based on identifying that the reflector device is within the threshold distance of the initiator device.

In an implementation, the method further includes: storing, for each of the plurality of first channels, the channel response metric in an entry of a channel sounding array; and storing, for each of the plurality of second channels, the predetermined value for the channel response metric in an entry of the channel sounding array. The method also includes, for each of the plurality of second channels, updating the stored predetermined value for the channel response metric to the calculated channel response metric.

In one implementation, providing, for each of the plurality of second channels, the predetermined value comprises providing a zero value for each of the plurality of second channels. In another instance, providing, for each of the plurality of second channels, the predetermined value comprises providing a linear regression of the channel response metric for at least one neighboring channel for each of the plurality of second channels.

In one implementation, the method further includes determining a plurality of channel response metrics for each of the first plurality of channels, each of the plurality of channel response metrics associated with an antenna of a plurality of antennas. Determining, for each of the plurality of first channels, the channel response metric may include determining a square ($H^2$) of a channel response (H) for the corresponding channel of the plurality of first channels. And calculating the group delay may be according to: $G(f)=-diff$ $(unwrap(angle(H^2(f)))$, where $H^2(f)$ is the channel response metric for the corresponding channel, unwrap is a function to unwrap a phase of the angle to a linear phase, and diff is a difference function between the phase of the channel response metric of two consecutive channels of the wireless link. The method also may include calculating, for each of the plurality of second channels, the channel response metric according to: $T=S*exp(rot\_count*i+G\_mean)$, where T is the channel response metric for the corresponding channel of the plurality of second channels, S is the channel response metric for a neighboring channel of the plurality of first channels, rot_count is a distance between the corresponding channel of the plurality of second channels and the neighboring channel, and G_mean comprises the group delay metric.

In another aspect, an apparatus includes: at least one antenna; a transceiver coupled to the at least one antenna to transmit and receive radio frequency (RF) signals; and a processor coupled to the transceiver. In an embodiment, the transceiver includes: a RF circuit to transmit and receive the RF signals; and at least one digital circuit coupled to the RF circuit to process digital signals, where the at least one digital circuit is to initiate a channel sounding process with a device to couple to the apparatus via a wireless link. This process may: determine, for each of a plurality of first channels of the wireless link, a channel response metric, and store the channel response metric in a channel sounding array; and provide, for each of a plurality of second channels of the wireless link comprising advertisement channels, a predetermined value for a channel response metric, and store the predetermined value in the channel sounding array. In turn, the processor is to: access the channel sounding array and calculate a group delay for each of the plurality of first channels and each of the plurality of second channels based on the channel response metric for the corresponding channel and the channel response metric for a neighboring channel; determine a group delay metric based on the group delay for the plurality of first channels and the plurality of second channels; calculate, for each of the plurality of second channels, a channel response metric based on the channel response metric for the neighboring channel and the group delay metric; determine a distance between the apparatus and the device based at least in part on the channel response metric for each of the plurality of first channels and the calculated channel response metric for each of the plurality of second channels; and control access to a protected location based at least in part on the distance.

In one implementation, the apparatus further comprises a non-volatile memory coupled to the at least one processor, where the non-volatile memory is to store a protocol stack, the protocol stack comprising instructions to perform the channel sounding process. The protocol stack further may further include instructions to calculate the group delay for each of the plurality of first channels and each of the plurality of second channels.

In one implementation, the at least one digital circuit is to determine, for each of the plurality of first channels, the channel response metric comprising determining a square ($H^2$) of a channel response (H) for the corresponding channel of the plurality of first channels. The processor may calculate the group delay according to: $G(f)=-diff(unwrap(angle(H^2(f)))$, where $H^2(f)$ is the channel response metric for a corresponding channel, unwrap is a function to unwrap a phase of the angle to a linear phase, and diff is a difference function between the phase of the channel response metric of two consecutive channels of the wireless link.

In an embodiment, the apparatus is a vehicle computing system of a vehicle, and in response to a determination that the device comprising a key fob is within a threshold distance of the vehicle computing system, is to cause the vehicle to be unlocked.

In yet another aspect, at least one non-transitory storage medium includes instructions that when executed by at least one processor cause the at least one processor to perform a method comprising: determining, for each of a plurality of first channels of a wireless link between an initiator device and a reflector device, a channel response metric; providing, for each of a plurality of second channels of the wireless link, the plurality of second channels comprising advertisement channels, a predetermined value for a channel response metric; calculating a group delay for each of the plurality of first channels and each of the plurality of second channels based on the channel response metric for the corresponding channel and the channel response metric for a neighboring channel; determining a group delay metric based on the group delay for the plurality of first channels and the plurality of second channels; and calculating, for each of the plurality of second channels, a channel response metric based on the channel response metric for the neighboring channel and the group delay metric.

In an implementation, the method further comprises: determining a distance between the initiator device and the reflector device based at least in part on the channel response metric for each of the plurality of first channels and the calculated channel response metric for each of the plurality of second channels; identifying, based at least in part on the distance, that the reflector device is within a threshold distance of the initiator device; and enabling access to a protected location based on identifying that the reflector device is within the threshold distance of the initiator device.

In an implementation, the method further comprises: determining, for each of the plurality of first channels, the channel response metric comprising a square ($H^2$) of a channel response (H) for the corresponding channel of the plurality of first channels; calculating the group delay according to: $G(f)=-diff(unwrap(angle(H^2(f)))$, where unwrap is a function to unwrap a phase of the angle to a linear phase, and diff is a difference function between the phase of the channel response metric of two consecutive channels of the wireless link; and calculating, for each of the plurality of second channels, the channel response metric according to: $T=S*exp(rot\_count*i+G\_mean)$, where T is the channel response metric for the corresponding channel of the plurality of second channels, S is the channel response metric for a neighboring channel of the plurality of first channels, rot_count is a distance between the corresponding channel of the plurality of second channels and the neighboring channel, and G_mean comprises the group delay metric.

BRIEF DESCRIPTION OF THE DRAWINGS

FIG. 3 is a flow diagram of a method in accordance with another embodiment.

DETAILED DESCRIPTION

In various embodiments, a wireless device is configured to initiate a channel sounding procedure to obtain sample information of multiple channels of a wireless link that couples two wireless devices. Since, as discussed above, this channel sounding process does not obtain samples for all channels, the initiator wireless device also is configured to efficiently recover sample information for the missing channels in a manner that consumes low processing resources and avoids the need for a neural network-based approach.

In general, channel sounding uses Phase-Based Ranging (PBR), Round TripTime (RTT), or both to accurately measure the distance between two wireless devices. The channel sounding process uses communications between the devices over one or more antenna paths, where multiple antennas can be leveraged to minimize multipath effects and enhance accuracy. In channel sounding, a first device is designated as an initiator and a second device is designated as a reflector. These devices exchange information across a subset of the wireless physical channels of their wireless link, with the initiator transmitting first, followed by the reflector's response. For RTT, a Time of Flight (ToF) for a packet to be exchanged between the initiator and the reflector is measured, and from this, the distance can be estimated. To achieve this, both devices record the Time of Arrival (ToA) and the Time of Departure (ToD). The differences between ToA and ToD for both the initiator and the reflector provide the data necessary for a reliable distance calculation.

For PBR, the principle of phase rotation in radio frequency (RF) signals is used to determine distance. In this process, the initiator sends a signal with specific frequency and amplitude information, and the reflector measures the phase of this received signal before sending a response. By comparing the phase differences between the signals from the devices, their relative distance can be determined. The two devices alternately transmit and receive multiple times over different frequencies (channels), resolving ambiguities and improving precision, even in the presence of multipath reflections. However, as discussed above, the obtained information is not available for all channels due to the presence of advertisement and possibly other reserved channels.

Figure 1:
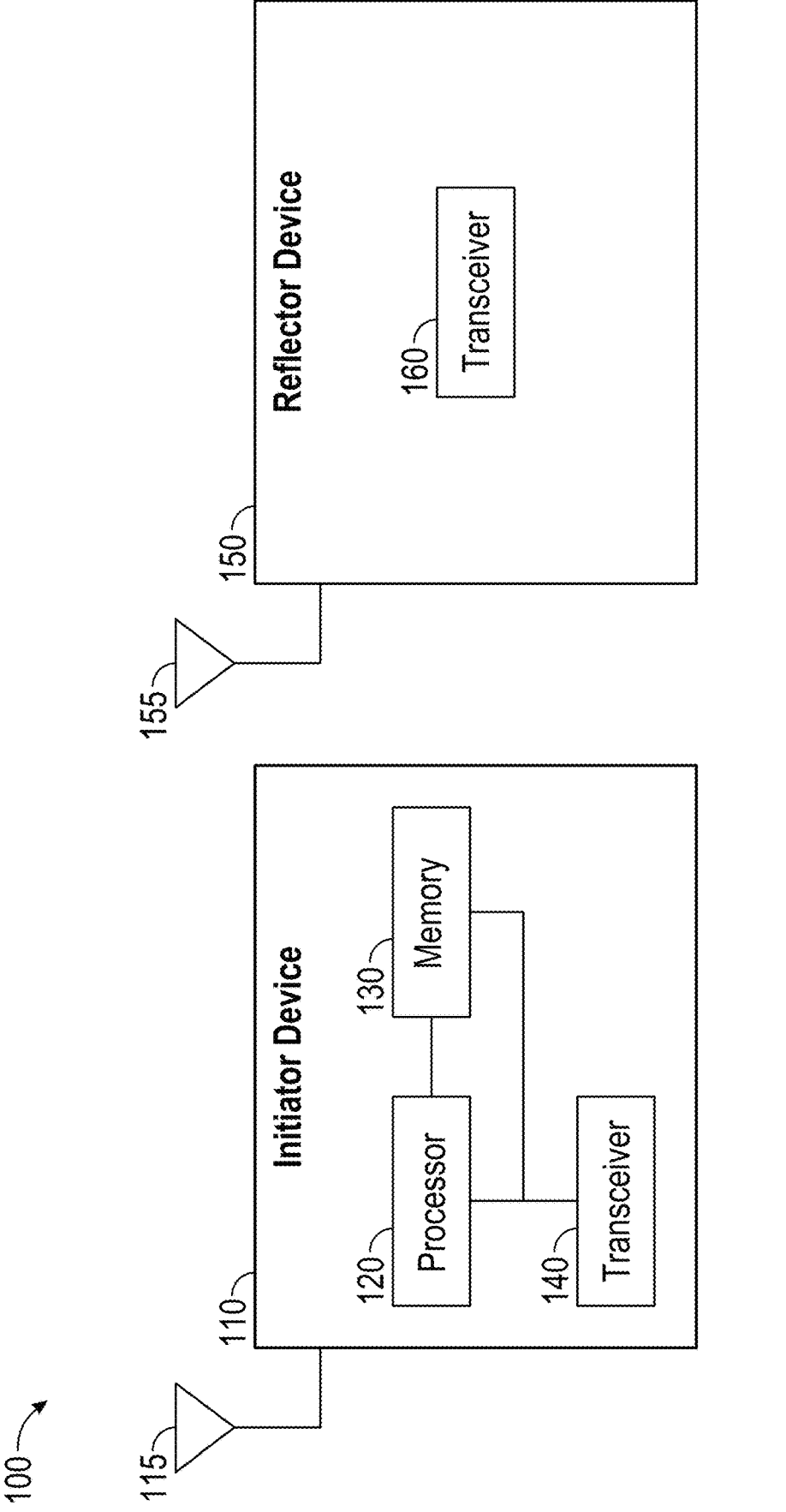
FIG. 1 is a block diagram of a wireless environment in accordance with an embodiment.

Referring now to FIG. 1, shown is a block diagram of an environment in accordance with an embodiment. More specifically as shown in FIG. 1, an environment 100 is a short-range wireless network that includes devices in communication with each other according to a given short-range wireless protocol. While embodiments described herein are in connection with a Bluetooth protocol, understand that the techniques described herein may be used in connection with other protocols.

In the high level shown in FIG. 1, a first wireless device is implemented as an initiator device 110 that is in wireless communication with a second wireless device, implemented as a reflector device 150. One or both devices may be Internet of Things (IoT) devices, in some use cases. Although embodiments are not limited in this regard, for purposes of illustration, assume that initiator device 110 is a vehicle system, such as a vehicle computing system, while reflector device 150 is a key fob for the vehicle. With embodiments herein, a channel sounding process may be performed between these devices to enable efficient, low power distance estimation. With this accurate distance estimation, a given operation may be performed. For example, the vehicle computing system may cause the vehicle and/or its doors to be unlocked based at least in part on the distance estimation. With embodiments herein, this distance estimation may be performed according to a channel sounding process, even though certain needed information is not available. Specifically, a channel sounding process does not obtain channel sounding information for at least certain channels of a Bluetooth communication link (including, but not limited to advertisement channels).

In the high level view shown in FIG. 1, initiator device 110 includes at least one antenna 115. In addition, initiator device 110 includes a processor 120, which may be implemented as a system on chip (SoC) or other host processor of the vehicle computing system. As seen, processor 110 couples to a memory 130 and also to a transceiver 140. In embodiments, transceiver 140 may be implemented as a multi-protocol transceiver that also can be part of a SoC, e.g., including one or more cores (such as a microcontroller unit (MCU) or other core), that performs wireless communication according to multiple wireless protocols, including, e.g., Bluetooth (and Bluetooth Low Energy (BLE)) and Wi-Fi protocols. As such, transceiver 140 may perform a channel sounding process in accordance with an embodiment to enable accurate and efficient distance estimation between initiator device 110 and reflector device 150. Although shown with these limited components in the embodiment of FIG. 1, understand that a vehicle computing system may include many more components, including sensors, storage, additional processing resources and so forth.

Still with reference to FIG. 1, reflector device 150 also includes at least one antenna 155. As shown, reflector device 150 also includes a transceiver 160, which also may be a multi-protocol wireless transceiver. Of course in other implementations, transceiver 160 may be implemented as a single protocol transceiver, e.g., a Bluetooth transceiver. In any event, transceiver 160 is configured to perform a channel sounding process in response to a request for the channel sounding process received from initiator device 110.

Understand that in the high level view illustrated in FIG. 1, reflector device 150 is shown with only antenna 155 and transceiver 160; of course, additional components may be present, such as a non-volatile storage to store a tag or other key for use in authentication. In other cases, transceiver 160 may include non-volatile storage to store such key. Similarly, transceiver 160 may be implemented as a SoC that includes some type of processing resource, such as a microcontroller, processing core or so forth, to control wireless communications as well as to perform a channel sounding process as described herein.

Figure 2:
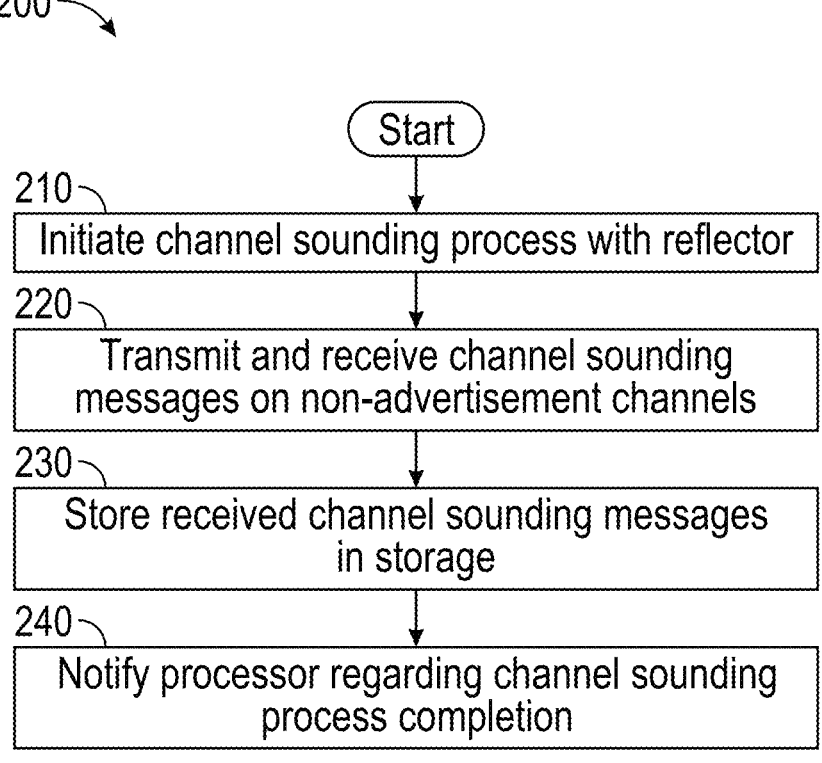
FIG. 2 is a flow diagram of a method in accordance with an embodiment.

Referring now to FIG. 2, shown is a flow diagram of a method in accordance with an embodiment. In FIG. 2, method 200 is a high level view of a channel sounding process to accurately and efficiently determine a distance between two wireless devices. In FIG. 2, method 200 is shown from the view of an initiator device, such as initiator device 110 described above with regard to FIG. 1. As such, method 200 may be performed by hardware circuitry of the initiator device, alone and/or in connection with firmware and/or software. Method 200 begins by initiating a channel sounding process with a reflector (block 210). In an embodiment, the initiator device may send a channel sounding request to the reflector when it identifies presence of the reflector within a short range of the initiator device. In the example discussed above, a vehicle system may perform block 210 when it detects presence of a key fob within a local environment of the vehicle.

Still referring to FIG. 2, control next passes to block 220, where channel sounding messages are transmitted and received on non-advertisement channels. In a BLE implementation there are 79 available logical channels (generically referred to herein as "channels") each at a different frequency and collectively forming a wireless link or channel, which is the entire radio space between the two devices. However, certain of the logical channels are reserved for advertisements and/or are otherwise reserved. In a particular implementation, there may be 7 advertisement channels, such that the channel sounding messages are transmitted and received on 72 logical channels. Further details regarding these channel sounding messages are now described.

Channel sounding is performed on a channel sounding physical layer that uses amplitude-shift keying modulation on 72 physical channels. The channel sounding radio operations are time multiplexed in a coordinated fashion with other BLE radio operations, such as advertising, scanning, and data communication. A link layer of a BLE protocol stack may be configured to: negotiate and set up a channel sounding procedure between two devices; schedule the channel sounding radio operations; configure the RF/PHY layer to perform tone exchanges during each radio operation; and manage channel sounding security procedures.

A channel sounding procedure includes a series of radio operations known as channel sounding events. During a channel sounding event, two devices exchange information used for distance estimation. This exchange includes tones used for distance estimation and packets containing data related to the channel sounding procedure. A channel sounding event includes subevents, with each subevent entailing multiple channel sounding steps. A channel sounding step is a series of tightly synchronized tone transmissions between devices. By dividing a channel sounding procedure into events and subevents, channel sounding radio activity can be flexibly scheduled to co-exist with other timing-sensitive Bluetooth communications.

The high-level communication sequence between two devices performing a channel sounding procedure starts with establishment of a BLE connection. The devices then exchange channel sounding capabilities and negotiate the configuration. After channel sounding security is enabled, the channel sounding procedure can start. Following each channel sounding subevent, the devices exchange measurement results, which is repeated for all available physical channels, after which the channel sounding procedure is terminated.

Still referring to FIG. 2, next at block 230, received channel sounding messages (or at least a payload thereof) may be stored in a storage of the initiator device. In an embodiment, this stored information may include complex samples (in-phase (I) and quadrature phase (Q) samples) from both initiator and reflector devices. This storage may be a volatile memory such as a random access memory or a non-volatile memory. In any event, the message content may be stored in association with an indication of the given Bluetooth channel for which the content was received.

Finally, at block 240, a processor is notified that the channel sounding process has completed. As an example, with regard to the initiator device in FIG. 1, the transceiver may notify the host processor that the channel sounding process is completed. In this way, the measurement results from the link layer are sent up to an application (e.g., that executes on a host processor of the initiator device) that may use a distance estimation algorithm to calculate the distance between the two devices. Of course in other cases, a core of the transceiver itself may perform the distance estimation and recover channel response information for missing channels, as described herein.

In embodiments, this application also may be configured to determine channel metric information for the missing channels, which may be based at least in part on channel metric information for one or more measured channels. Note that the application may be implemented as part of firmware, e.g., transceiver firmware that is stored in one or more non-transitory storage media, such as a flash memory of the transceiver or a separate non-volatile memory coupled to the transceiver. Based on the received messages, the host processor performs a distance determination as will be described further herein. Although shown at this high level in the embodiment of FIG. 2, many variations and alternatives are possible.

Referring now to FIG. 3, shown is a flow diagram of a method in accordance with another embodiment. More specifically, method 300 of FIG. 3 is a method for determining distance between two wireless devices based on channel sounding information obtained during a channel sounding process. In various embodiments, method 300 may be performed by a host processor of an initiator device; however, understand that in other cases a transceiver integrated circuit of the initiator device may perform method 300 via an included processor such as a microcontroller or core.

As illustrated, method 300 begins by reading channel sounding messages from a storage (block 310). As described above, a channel sounding process results in messages including payload data for all non-advertisement or other reserved channels, which may be stored in a given storage, e.g., a dynamic or non-volatile memory.

Still referring to FIG. 3, next control passes to block 320, where a channel response metric may be calculated for each non-advertisement channel. In an embodiment, the channel response metric may be a square of a channel response ($H^2$). This square is obtained by multiplying the initiator sample with the reflector sample. Note that by combining the initiator and reflector samples, the local oscillator effects of both devices cancel out. In other embodiments the channel response metric may be obtained by calculating a square root of the square of the channel response. However, a sign ambiguity may arise in this case.

Note that the wireless channel between the two devices has a channel response, also called a transfer function, which can be estimated. The ideal transfer function maps the sent RF signal to that of the received RF signal, containing all reflections, all noises, and all frequencies. In order to measure the channel response (H), communication is made on each BLE frequency. By sampling the transfer function on these multiple frequencies, a frequency domain transfer function is formed as a channel response estimate (H).

These squared channel response values may be stored in a channel sounding array. In various implementations, this array may be stored in a memory, e.g., in a cache memory or a system memory coupled to the host processor. In one implementation, the channel sounding array may be implemented with a plurality of entries, where each entry is associated with a given channel and includes a field for storing this square of the channel response, which may be a complex value.

In addition to the channel samples, embodiments may store additional metadata for the different channels. For example, a tone quality indicator may be provided for each channel, which is a measure of how valid each channel measurement has been. In some embodiments, if this tone quality indicator indicates that a given channel is bad, these channels can be filtered out from being used, and the channel samples can be replaced in the same way as advertisement channels, as described herein.

As there is no channel response information available for the advertisement or other reserved channels, at block 330 entries for these channels may be populated with predetermined values. In one embodiment, the predetermined value may be a zero value. However, in other cases the predetermined value may be a linear regression obtained from neighboring channels, or a value of neighboring channel could be used. Thus at this point, the channel sounding array has fully populated entries for each channel, with each channel represented by a complex value corresponding to the channel response square ($H^2$). Stated another way, the channel sounding array is configured as a complex-valued array that is uniform in frequencies.

Still referring to FIG. 3, next control passes to block 340 where a group delay may be calculated for each frequency. In an embodiment, this group delay may be calculated based on a difference between consecutive values, namely differences between the phase of the square of the channel response for neighboring channels. In one embodiment, the group delay (G(f)) of the channel response square ($H^2$(f)) may be calculated according to: $G(f) = -\text{diff}(\text{unwrap}(\text{angle}(H^2(f)))$ [EQ. 1]. In Eq. 1, the function diff(X) calculates the difference between consecutive values in array X. In turn, the function unwrap(Y) unwraps phases Y from the range of $[0, 2\pi]$ to a linear phase.

In this embodiment for group delay calculation, an unwrapped phase response is obtained. Usually, the angle calculation in math libraries results in an angle value that is in the interval of $[-\pi, \pi]$ (or equivalent in degrees), and thus this angle is unwrapped. In one example, a MATLAB unwrap function may be used to unwrap this value. The group delay for a given channel is then calculated using Eq. 1 above.

Control next passes to block 350. At block 350, from the calculated group delays, a group delay metric may be determined. In one embodiment, the group delay metric may be a mean of the group delay. Of course, in other embodiments, a different group delay metric may be determined from the set of group delays, such as a median value or other metric.

Still referring to FIG. 3, this group delay metric may be used in calculating an advertisement channel sample (T). Note that the term "sample" in this context (advertisement or other missing channel) is intended to mean a square of a channel response for the channel, such that the same information determined for non-advertisement channels also is available for the advertisement or other missing channels. At block 360, the advertisement channel sample may be calculated based on a neighboring channel sample (S), where this advertisement channel sample (T) is calculated by phase rotation of S to T using the mean group delay. In an embodiment, the advertisement (or other missing) channel sample (T, for a target channel (ct) lacking a calculated channel response value) may be determined from a neighbor (existing) channel sample (S for a source channel (cs) having a calculated channel response value) by rotating the existing channel value (S) into the logical place of the missing channel value (T) in frequency response, according to: $T=S*exp(rot\_count*i+G\_mean)$ [Eq. 2], where $rot\_count=cs-ct$ [Eq. 3], namely a distance between source and target channels. In an embodiment, the source channel may be selected to be the closest channel to the target channel having a valid sample.

In one implementation, the variable rot_count is the distance in terms of the index of the channel sounding array (or equivalently in terms of Bluetooth channel index of range [0,78]). Assume that a target sample to fill is on index J, T(J), and the source channel to be rotated to obtain T, is on channel K, S(K). Then $rot\_count=K-J$, where both J and K are integers in the interval of [0, 78], namely the indexes of the Bluetooth channel numbers.

As an example of the process for recovering a channel response metric for an advertisement channel, consider the following. To obtain the channel response metric ($H^2$) for an advertisement channel at channel index #23 ($H^2(23)$), the known channel value at index #22 ($H^2(22)$), is rotated using a rot_count value of $-1$. So $H^2(23)$ is obtained from $H^2(22)$ with a rot_count of $-1$. For another example, $H^2(24)$ can be obtained from $H^2(22)$ with a rot_count of $-2$ (or equivalently $H^2(24)$ could be obtained from $H^2(26)$ with a positive rot_count of 2). In these examples, a closest known channel may be used as the source channel.

Finally, at block 370, the distance between initiator and reflector may be determined using the channel samples. In an embodiment, a complex signal processing technique may be used such as a multiple signal classification (MUSIC) algorithm as implemented in MATLAB.

Although shown at this high level in the embodiment of FIG. 3, understand that variations and alternatives are possible. For example, the above discussion is for recovering channel metric information using information from a single antenna. In other embodiments, the channel sounding process may be performed using multiple antennas per device, to better account for multipath situations and increase accuracy. In such cases, the obtained information from the multiple antennas may be combined, e.g., via an averaging process. Also, while the channel sounding process can be performed only once to determine an accurate distance between devices, in other cases the channel sounding process can be performed at a regular interval (e.g., every 10 milliseconds) to account for movement between the devices.

Figure 4:
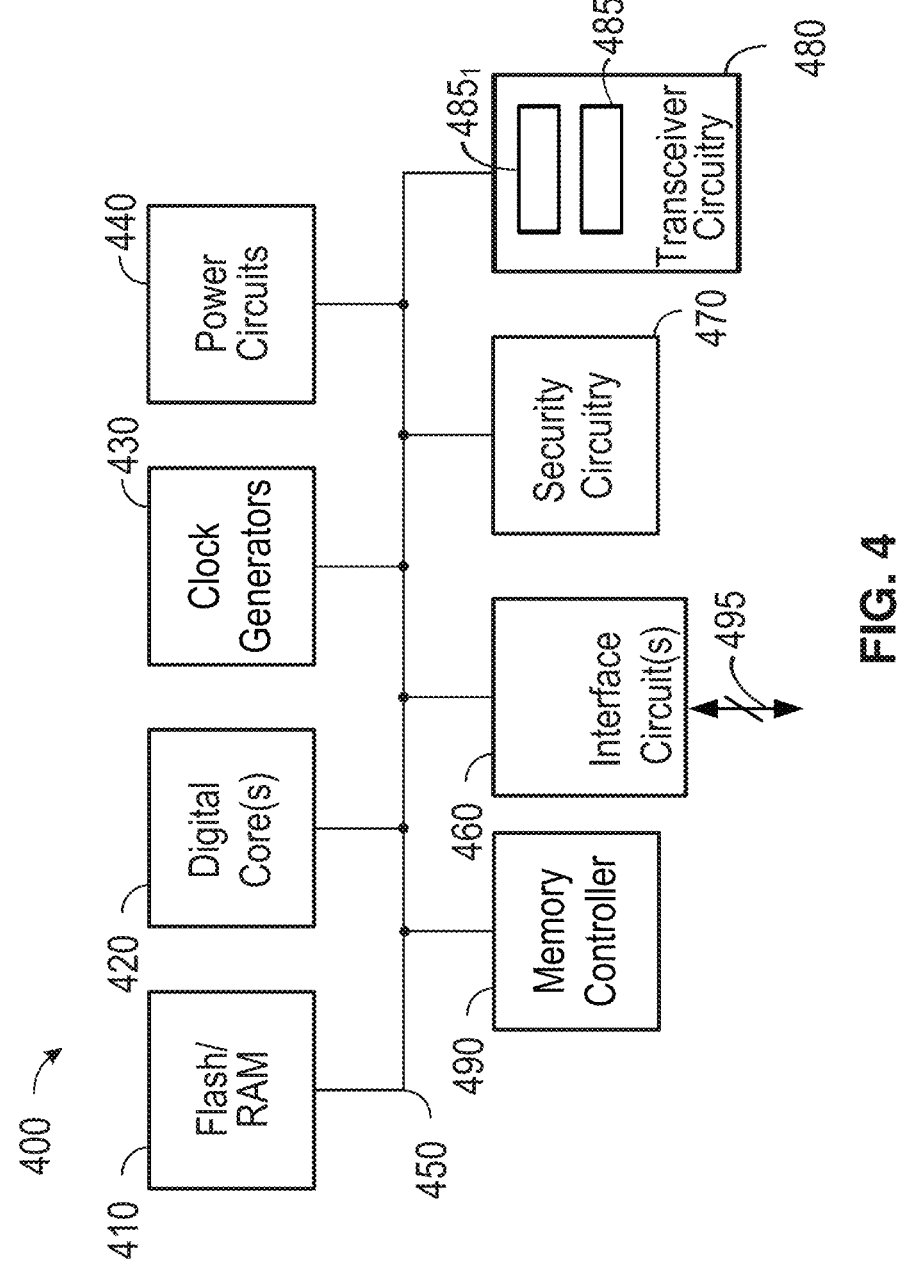
FIG. 4 is a block diagram of a representative integrated circuit in accordance with an embodiment.

Referring now to FIG. 4, shown is a block diagram of a representative integrated circuit 400 that may recover missing channels when performing channel sounding distance measurements, as described herein. In the embodiment shown in FIG. 4, integrated circuit 400 may be, e.g., a dual mode wireless transceiver that may operate according to one or more wireless protocols (e.g., WLAN and Bluetooth, among others) or other device that can be used in a variety of use cases. In one or more embodiments, the circuitry of integrated circuit 400 shown in FIG. 4 may be implemented on a single semiconductor die.

Integrated circuit 400 may be included in a range of devices including a variety of stations, including smartphones, wearables, smart home devices, IoT devices, vehicle devices, other consumer devices, or industrial, scientific, and medical (ISM) devices, among others.

In the embodiment shown, integrated circuit 400 includes a memory system 410 which in an embodiment may include volatile storage, such as RAM and non-volatile memory such as a flash memory. The flash memory is a non-transitory storage medium that can store instructions and data. In embodiments, this storage may store firmware to perform a channel recovery process as described herein for advertisement and other reserved channels. As further shown integrated circuit 400 also may include a memory controller 490.

Memory system 410 couples via a bus 450 to one or more digital cores 420, which may include one or more cores and/or microcontrollers that act as processing units of the integrated circuit. In turn, digital cores 420 may couple to clock generators 430 which may provide one or more phase locked loops or other clock generator circuitry to generate various clocks for use by circuitry of the IC.

As further illustrated, IC 400 further includes power circuitry 440. Additional circuitry may be present depending on particular implementation to provide various functionality and interaction with external devices. Such circuitry may include interface circuitry 460 which provides a digital communication interface with additional circuitry (such as a memory, to couple to IC 400 via a link 495). IC 400 also may include security circuitry 470 to perform wireless security techniques, including performing channel sounding security prior to performing a channel sounding process as described herein.

In addition, as shown in FIG. 4, transceiver circuitry 480 may be provided to enable transmission and reception of wireless signals, e.g., according to one or more of a local area or wide area wireless communication scheme, such as Zigbee, Bluetooth, IEEE 802.11, IEEE 802.15.4, cellular communication or so forth. As shown, transceiver circuitry 480 includes multiple transceiver circuits $485_{1-n}$, to communicate according to multiple wireless communication protocols, including a BLE protocol as used herein. Understand while shown with this high level view, many variations and alternatives are possible.

Figure 5:
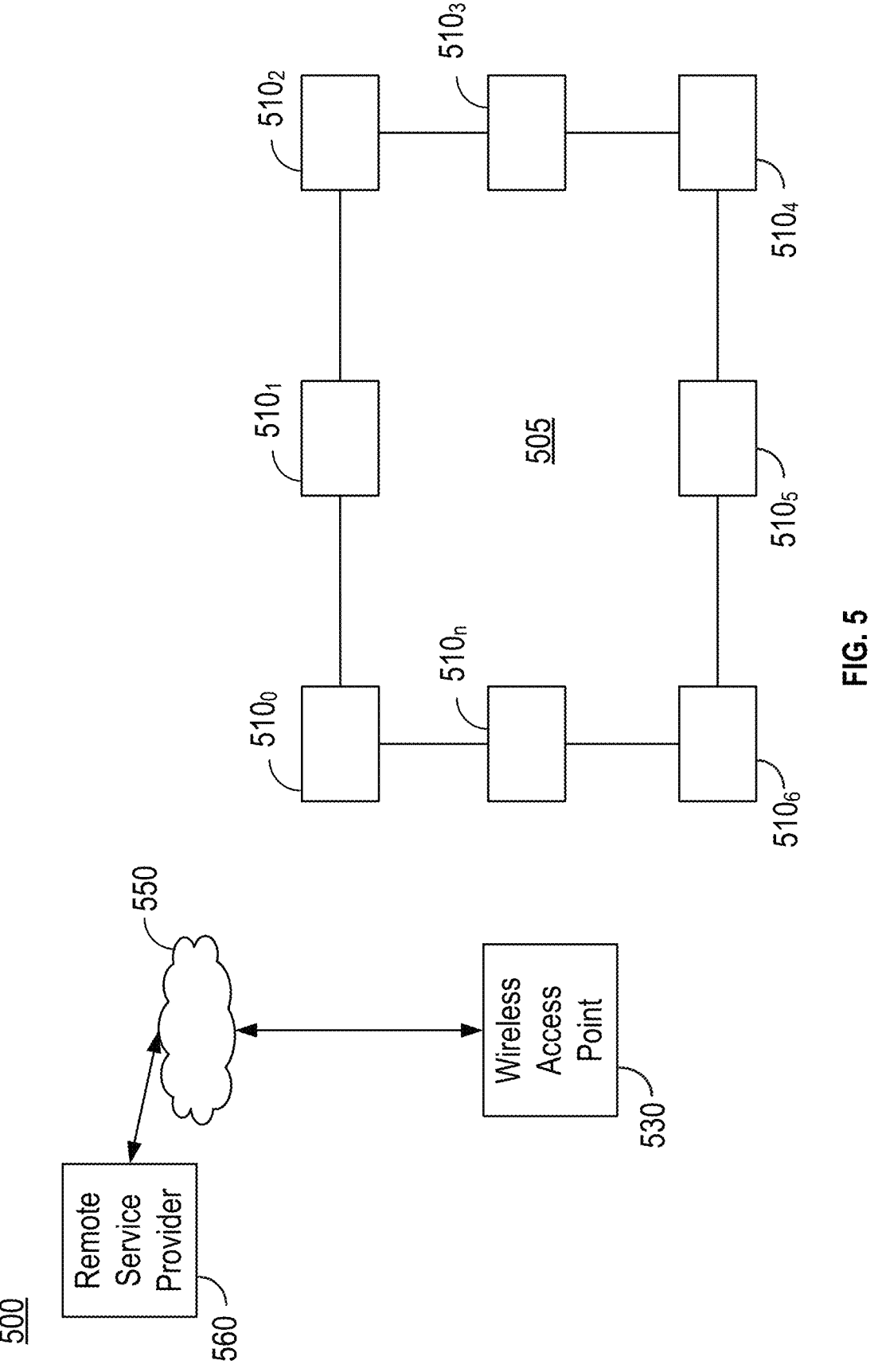
FIG. 5 is a high level diagram of a network in accordance with an embodiment.

ICs such as described herein may be implemented in a variety of different devices such as wireless stations, IoT devices, vehicle devices or so forth. Referring now to FIG. 5, shown is a high level diagram of a network in accordance with an embodiment. As shown in FIG. 5, a network 500 includes a variety of devices, including wireless stations including smart devices such as IoT devices, access points and remote service providers, which may leverage embodiments for recovering missing channels (e.g., advertisement channels) when performing channel sounding distance determinations as described herein.

In the embodiment of FIG. 5, a wireless network 505 is present, e.g., in a building having multiple wireless devices $510_{0-n}$. As shown, wireless devices 510 couple to an access point 530 that in turn communicates with a remote service provider 560 via a wide area network 550, e.g., the internet. Understand while shown at this high level in the embodiment of FIG. 5, many variations and alternatives are possible.

Embodiments may be used in a wide variety of contexts, including smart door locks and access systems, and asset tracking and management. As examples, channel sounding may be used in connection with IoT devices to perform proximity awareness, and securely control access to protected spaces or locations, including geofencing, door locks and keyless entry. Embodiments also may be used for locating techniques, for applications like asset management and personal item tracking, such as warehouse management, item tracking, pet tracking or so forth.

Embodiments provide a low complexity, low processing-intensive technique to obtain channel metric information for advertisement or other reserved channels. In contrast, neural network (NN)-based approaches consume significant processor resources. Further these NN-based techniques have an accuracy that is dependent on training data, in contrast to embodiments herein, which use real data from actual measurements to perform channel recovery.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
determining, for each of a plurality of first channels of a wireless link between an initiator device and a reflector device, a channel response metric;
providing, for each of a plurality of second channels comprising advertisement channels, a predetermined value for a channel response metric;
calculating a group delay for each of the plurality of first channels and each of the plurality of second channels based on the channel response metric for the corresponding channel and the channel response metric for a neighboring channel;
determining a group delay metric based on the group delay for the plurality of first channels and the plurality of second channels;
calculating, for each of the plurality of second channels, a channel response metric based on the channel response metric for the neighboring channel and the group delay metric;
determining a distance between the initiator device and the reflector device based, at least in part, on the channel response metric for each of the plurality of first channels and the calculated channel response metric for each of the plurality of second channels; and
enabling access to a protected location based, at least in part, on the distance between the initiator device and the reflector device.

2. The method of claim 1, further comprising:
identifying, based at least in part on the distance, that the reflector device is within a threshold distance of the initiator device; and
enabling the access to the protected location based on identifying that the reflector device is within the threshold distance of the initiator device.

3. The method of claim 1, further comprising:
storing, for each of the plurality of first channels, the channel response metric in an entry of a channel sounding array; and
storing, for each of the plurality of second channels, the predetermined value for the channel response metric in an entry of the channel sounding array.

4. The method of claim 3, further comprising, for each of the plurality of second channels, updating the stored predetermined value for the channel response metric to the calculated channel response metric.

5. The method of claim 1, wherein providing, for each of the plurality of second channels, the predetermined value comprises providing a zero value for each of the plurality of second channels.

6. The method of claim 1, wherein providing, for each of the plurality of second channels, the predetermined value comprises providing a linear regression of the channel response metric for at least one neighboring channel for each of the plurality of second channels.

7. The method of claim 1, further comprising determining a plurality of channel response metrics for each of the first plurality of channels, each of the plurality of channel response metrics associated with an antenna of a plurality of antennas.

8. The method of claim 1, wherein determining, for each of the plurality of first channels, the channel response metric comprising determining a square ($H^2$) of a channel response (H) for the corresponding channel of the plurality of first channels.

9. The method of claim 8, further comprising calculating the group delay according to: $G(f)=-diff(unwrap(angle(H^2(f))$, where $H^2(f)$ is the channel response metric for the corresponding channel, unwrap is a function to unwrap a phase of the angle to a linear phase, and diff is a difference function between the phase of the channel response metric of two consecutive channels of the wireless link.

10. The method of claim 9, further comprising calculating, for each of the plurality of second channels, the channel response metric according to: $T=S*exp(rot\_count*i+G\_mean)$, where T is the channel response metric for the corresponding channel of the plurality of second channels, S is the channel response metric for a neighboring channel of the plurality of first channels, rot_count is a distance between the corresponding channel of the plurality of second channels and the neighboring channel, and G_mean comprises the group delay metric.

11. An apparatus comprising:
at least one antenna;
a transceiver coupled to the at least one antenna, the transceiver to transmit and receive radio frequency (RF) signals, the transceiver comprising:
a RF circuit to transmit and receive the RF signals; and
at least one digital circuit coupled to the RF circuit to process digital signals, the at least one digital circuit to initiate a channel sounding process with a device to couple to the apparatus via a wireless link to:
determine, for each of a plurality of first channels of the wireless link, a channel response metric, and store the channel response metric in a channel sounding array; and
provide, for each of a plurality of second channels of the wireless link comprising advertisement channels, a predetermined value for a channel response metric, and store the predetermined value in the channel sounding array; and
a processor coupled to the transceiver, the processor to:
access the channel sounding array and calculate a group delay for each of the plurality of first channels and each of the plurality of second channels based on the channel response metric for the corresponding channel and the channel response metric for a neighboring channel;
determine a group delay metric based on the group delay for the plurality of first channels and the plurality of second channels;
calculate, for each of the plurality of second channels, a channel response metric based on the channel response metric for the neighboring channel and the group delay metric;
determine a distance between the apparatus and the device based at least in part on the channel response metric for each of the plurality of first channels and the calculated channel response metric for each of the plurality of second channels; and
control access to a protected location based at least in part on the distance.

12. The apparatus of claim 11, further comprising a non-volatile memory coupled to the at least one processor, wherein the non-volatile memory is to store a protocol stack, the protocol stack comprising instructions to perform the channel sounding process.

13. The apparatus of claim 12, wherein the protocol stack further comprises instructions to calculate the group delay for each of the plurality of first channels and each of the plurality of second channels.

14. The apparatus of claim 11, wherein the at least one digital circuit is to determine, for each of the plurality of first channels, the channel response metric comprising determining a square ($H^2$) of a channel response (H) for the corresponding channel of the plurality of first channels.

15. The apparatus of claim 14, wherein the processor is to calculate the group delay according to: $G(f)=-diff(unwrap(angle(H^2(f))$, where $H^2(f)$ is the channel response metric for a corresponding channel, unwrap is a function to unwrap a phase of the angle to a linear phase, and diff is a difference function between the phase of the channel response metric of two consecutive channels of the wireless link.

16. The apparatus of claim 11, wherein the apparatus comprises a vehicle computing system of a vehicle, and in response to a determination that the device comprising a key fob is within a threshold distance of the vehicle computing system, is to cause the vehicle to be unlocked.

17. At least one non-transitory storage medium comprising instructions that when executed by at least one processor cause the at least one processor to perform a method comprising:

determining, for each of a plurality of first channels of a wireless link between an initiator device and a reflector device, a channel response metric;

providing, for each of a plurality of second channels of the wireless link, the plurality of second channels comprising advertisement channels, a predetermined value for a channel response metric;

calculating a group delay for each of the plurality of first channels and each of the plurality of second channels based on the channel response metric for the corresponding channel and the channel response metric for a neighboring channel;

determining a group delay metric based on the group delay for the plurality of first channels and the plurality of second channels;

calculating, for each of the plurality of second channels, a channel response metric based on the channel response metric for the neighboring channel and the group delay metric;

determining a distance between the initiator device and the reflector device based, at least in part, on the channel response metric for each of the plurality of first channels and the calculated channel response metric for each of the plurality of second channels; and enabling access to a protected location based, at least in part, on the distance between the initiator device and the reflector device.

18. The at least one non-transitory storage medium of claim 17, wherein the method further comprises:

identifying, based at least in part on the distance, that the reflector device is within a threshold distance of the initiator device; and enabling access to the protected location based on identifying that the reflector device is within the threshold distance of the initiator device.

19. The at least one non-transitory storage medium of claim 17, wherein the method further comprises:

determining, for each of the plurality of first channels, the channel response metric comprising a square ($H^2$) of a channel response (H) for the corresponding channel of the plurality of first channels;

calculating the group delay according to: $G(f)=-diff(unwrap(angle(H^2(f))$, where unwrap is a function to unwrap a phase of the angle to a linear phase, and diff is a difference function between the phase of the channel response metric of two consecutive channels of the wireless link; and calculating, for each of the plurality of second channels, the channel response metric according to: $T=S*exp(rot\_count*i+G\_mean)$, where T is the channel response metric for the corresponding channel of the plurality of second channels, S is the channel response metric for a neighboring channel of the plurality of first channels, rot_count is a distance between the corresponding channel of the plurality of second channels and the neighboring channel, and G_mean comprises the group delay metric.

\* \* \* \* \*